United States Patent [19]
Kelly

[11] 3,710,516
[45] Jan. 16, 1973

[54] METHOD OF DRILLING GLASS

[75] Inventor: Joseph B. Kelly, Crestline, Ohio

[73] Assignee: PPG Industries, Inc., Pittsburgh, Pa.

[22] Filed: Feb. 19, 1971

[21] Appl. No.: 116,970

Related U.S. Application Data

[63] Continuation-in-part of Ser. No. 746,095, July 19, 1968, abandoned.

[52] U.S. Cl. ................................................. 51/283
[51] Int. Cl. ............................................. B24b 1/00
[58] Field of Search ...51/283, 81 R; 408/37, 92, 135, 408/136, 137, 130; 125/20

[56] References Cited

UNITED STATES PATENTS

| | | | |
|---|---|---|---|
| 3,568,367 | 3/1971 | Myers | 408/37 X |
| 2,941,338 | 6/1960 | Santschi | 125/20 X |
| 2,320,874 | 6/1943 | Lehmann | 173/158 X |
| 3,401,583 | 9/1968 | Jacobson | 408/130 |
| 2,322,237 | 6/1943 | Johansen | 408/137 X |
| 3,124,016 | 3/1964 | Reaser | 408/37 |
| 1,109,516 | 9/1914 | Dalton | 408/92 |

*Primary Examiner*—Donald G. Kelly
*Attorney*—Chisholm & Spencer

[57] ABSTRACT

A method of drilling holes in glass wherein a drill is rotated at a speed between about 3,400 rpm and about 3,600 rpm and advanced into a glass work piece at a constant forward rate of speed.

6 Claims, 3 Drawing Figures

PATENTED JAN 16 1973

INVENTOR
JOSEPH B. KELLY

ATTORNEYS

METHOD OF DRILLING GLASS

CROSS REFERENCE TO RELATED APPLICATION

This application is a continuation-in-part of application Ser. No. 746,095, filed July 19, 1968, and now abandoned.

BACKGROUND OF THE INVENTION

1. Field of the Invention

This invention relates to a method of drilling holes in hard refractories such as glass, concrete, and the like.

2. Description of the Prior Art

Diamond drilling of holes in automotive flat glass started in the mid-1950's with single holes in tempered vent windows. At present, there are as many as 10 holes in tempered side windows (sidelights). These holes benefit the automobile manufacturer in that savings result from simplified mounting arrangements through the holes and from the use of the tempered glass plate as a structural member to support its own lifting devices. In addition, holes in sidelights have eliminated the use of a number of metal components formerly required in conjunction with the lifting devices.

As the volume of holes drilled grew from less than 2 million in 1956 to 14 million in 1966 and over 18 million in 1968, the manufacturing problems associated with diamond drilling grew accordingly. These include excessive drill down-time, glass breakage, damaged drill bits, weak holes, and even closer center-to-center distances.

The general technique of drilling involves clamping the glass against the surface mounted between two diametrically opposed drill spindles. Diamond core drills are attached to the spindles, and cooling water is supplied to the center of the core by a revolving water joint. Drilling is accomplished by advancing a first drill about halfway through the glass and then retracting it; a second drill is then advanced to remove the core and finish the hole. It is not practical to drill glass from only one side, because the surface opposite the drill will spall just prior to breakthrough.

It has been customary to place holes in glass by applying a constant pressure or constant force to the drill. Constant-pressure drilling, with low drilling pressures, was chosen by glass producers because of the prevalent assumption that glass is weak and subject to breakage if too much force is applied against it. The idea was to keep the forces low and let the drill's ability to cut, i.e., the sharpness, determine the cutting rate. When drilling time became too long, the drill was resharpened by dressing it with an abrasive stone. Ideally, glass would never be broken, regardless of the sharpness of the drill, because insufficient force was available to break the glass.

With constant-pressure drilling, the time required to drill a hole is a function of the sharpness of the drill and of the forces applied. Drill sharpness is always changing and is a difficult property to control. The low drill forces necessary to prevent breakage are significantly altered by changes in friction in the system and therefore also difficult to control. The result is an unstable operation with drilling time continuously varying from 6 to 15 seconds. Sharpening is carried out about every 300 holes to maintain output rates. Multiple drilling units require interlocks to insure that all drills have completed their cycle before a plate is removed. For unknown reasons, some drill bits cannot be operated satisfactorily and have to be discarded. Drill life averages 6,000 to 8,000 holes per pair of bits.

With constant-pressure drilling, the rate of advance of the drill bit is a function of the friction in the drilling apparatus, the sharpness of the drill, and the resistive forces of the glass. Each of these varies throughout the life of the drill bit. Therefore, in constant-pressure drilling, the rate of advance of the drill bit varies throughout the life of the bit.

The most pertinent prior art of which I am aware comprises Lehmann, U.S. Pat. No. 2,320,874; Johansen, U.S. Pat. No. 2,322,237; and Santschi, U.S. Pat. No. 2,941,338.

The Lehmann patent relates, for example, "to mining machines and particularly relates to improvements in rotary drills for forming blast holes." Lehmann states that, "A further object of the invention is to provide a drill of the type mentioned which may be operated so that the rate of infeed of the drill is adjustable and may be set so that the rate of infeed is constant regardless of the resistance on the drill bit, or may be set so that the rate of infeed automatically varies in direct response to the amount of resistance to infeed of the material being worked upon so that if less resistance is encountered, the rate of infeed increases, and if greater resitance is encountered, the rate of infeed decreases." Lehmann further states "vulcanized rubber 32 is disposed between the facing surfaces of members 24 and 28 and is vulcanized to such surfaces so as to provide a cushion for the spindle nose."

The Johansen patent relates, for example, "to drilling apparatus, and more particularly to improvements in a drilling apparatus of the high speed, rotary, diamond core type." The reference states "the combined action of the resistance to penetration of the work by the drill bit and the resistance to rotation of the drill bit automatically effects control of the feeding pressure of the bit."

The Santschi patent discloses, for example, "an apparatus for drilling a hole in a glass sheet." The reference further states, "Air under pressure by pipes 121 to air feed drills 30 and the exhaust of air from the air cylinders and drills 30 via pipes 120 and 146 start drills 30 so that through the rotary-vane type of motor portion of each, spindles 50 and bit portions 62 and 63 are rotated. At the same time the air cylinder portion of each drill 30 moves the diamond-containing bit portions 62 and 63 towards glass sheet G mounted between backup plate 70 and clamp pad 110."

SUMMARY OF THE INVENTION

It is an object of this invention to provide a method of drilling glass by rotating a drill at a speed suitable for drilling glass, and advancing the drill into said glass at a constant rate of speed.

As used in this disclosure and claims, the terms "constant feed," "constant rate," and "constant feed rate," define a situation where the rate of advance of the drill bit is independent of any resistive force which the work piece may offer. Therefore, if the drill is set to advance at a speed of 0.060 inches per second, the drill will advance at this speed whether the drill is passing through air or through the work piece. In this sense, the rate of advance of the drill is constant. It is not intended, however, that the above-mentioned terms limit the invention to a situation where the drilling operation is conducted at a single speed. In some situations it may be desirable to vary the rate of advance of the drill. For example, while 0.060 inches per second is a desirable speed for drilling glass, there is no reason why the drill cannot be advanced at a rate of about 4 inches per second before the drill contacts the glass. Additionally, with some refractories, it may be desirable to vary the rate of advance of the drill as it penetrates the refractory. This is still "constant," as used in this disclosure, as long as the rate of advance is altered by an external source, and not by the resistance of the work piece. This is contrary to constant-pressure drilling where the rate of advance of the drill is inversely proportional to the resistance of the work piece.

In advancing the drill at a constant speed, I use a force far greater than that which is necessary, but I check this force so that only the pressure needed to keep the bit advancing at a given rate of speed is applied to the drill. In constant-pressure drilling, it is customary to use a force of about 50 to 60 pounds in drilling a ½ inch hole. In constant-feed drilling, I use an air cylinder that supplies about 300 pounds of force, but a system is used to check the force, so that only the force necessary to move the drill at a constant rate is applied. As the resistive load changes, the force applied to the drill will change to keep the rate of advance of the drill constant.

As far as I am aware, no one has ever considered constant-feed drilling as a solution to the problems of constant-pressure drilling in the glass industry. This is because those skilled in the art felt that as the bit advances, at a predetermined constant rate, it will produce a force that is capable of breaking the glass. Applicant has discovered that this is not true. Actually, this potential force is prevented from coming into contact with the glass because an apparatus checks the potential force, so that only the force necessary to drill a hole at a given rate of advance reaches the glass.

In constant-feed drilling, the depth of penetration of the drill bit into the glass is determined by the rate of advance of the bit, the speed of rotation of the bit, and the grit size of the diamonds. Unlike constant-pressure drilling, in constant-feed drilling, the depth of penetration is independent of variables such as friction in the drilling apparatus, sharpness of the drill bit, and resistance of the glass. Depth of penetration can therefore be controlled.

It has been customary in glass drilling to advance a drill bit at a constant pressure. Theoretically, if the resistive forces were constant, it would be possible to choose a constant pressure that would yield a constant rate of advance but, practically, it is impossible to determine such a constant pressure. In drilling a series of holes, conditions such as friction due to drill sharpness and friction in the drilling apparatus change. With the resistive forces changing, there is no basis for a constant force or pressure to move the drill at a constant rate of advance.

In drilling any one hole, the resistive forces are more uniform, but they are unpredictable. By this I mean that the resistive forces on the drill bit do not vary a great deal during the drilling of any one hole, but it is impossible to determine, in advance, what the resistive forces will be. For example, the frictional force caused by the drill contacting the glass will not vary greatly when drilling a single hole, but there are several unknowns to be considered in computing this force. These unknowns are such that the force changes randomly from one hole to the next, and so even though the force is relatively constant during the drilling of a single hole, there is no way to ascertain what it will be. Since we cannot determine the resistive forces in advance, for even a single hole, there is no basis for choosing a constant pressure that will yield a constant rate of advance.

It is not practical to choose a pressure that yields a decelerating rate of advance, since the speed will approach zero as the drill wears. (Dull drills are slower than fast drills in constant-pressure drilling.) Since it is impossible to find a pressure that would yield a constant speed, and since deceleration is undesirable, the drill bit generally accelerates as it travels through the glass, in constant-pressure drilling. This too is undesirable because the diamond drill bit penetrates too deeply into the glass too quickly, leaving the glass surface too close to the bonding material of the drill bit. With the glass surface close to the bonding material, there is little space for cooling fluid to circulate adjacent the bonding material and therefore the bonding material tends to deteriorate more rapidly. In addition, the glass fragments that are removed from the glass by the drill, mix with the cooling water and form an abrasive which also helps to deteriorate the bonding material. Since there is less cooling water, the glass fragment mixture is more concentrated, therefore being more abrasive to the bonding material of the drill bit.

Test results indicate that constant-rate drilling has many advantages over constant-pressure drilling. In particular, it is significant to note that a drill bit has a useful life of from 10 to 25 times as long when it is advanced at a constant rate, rather than at a constant pressure.

A second major advantage of the constant-rate method is that drill dulling has no effect on rate of advance or depth of penetration of the drill bit. In constant-pressure drilling, as the drill becomes dull, the rate of advance of the drill decreases. When this rate becomes so low that it is impractical to continue drilling, the apparatus is shut down and the drill must be sharpened. In constant-feed drilling, the rate of advance is independent of the sharpness or dullness of the drill. Therefore, since dullness has no effect on the rate of advance, the drill need not be sharpened as often. Further, where the drill is advanced at a constant rate, time can be used to control all drill functions. No interlocks are required, and multiple drills can even be controlled from one master timer.

Yet another advantage of constant-feed drilling is that sharpening can be accomplished in a number of ways. Conventional stoning (drilling through a bonded stick of silicon carbide or aluminum oxide) works well, but requires positioning the stone and removing it after drilling, with resultant interruption of production.

The simplest and best method of drill sharpening, however, is merely to reverse the direction of drill rotation, then continue drilling. By reversing the drills at predetermined times, it is possible to completely eliminate dulling problems. Using constant-pressure drilling, it does not appear to be possible to sharpen the drill successfully after the first reversal. This is probably due to the fact that in constant-pressure drilling, the drilling takes place on the bonding material at the base of the diamond, while with constant-feed drilling, the cutting takes place at the outermost diamond. Therefore, when one reverses the drill in the constant-feed method, the outermost diamond is removed, this being the one that is dull. In constant-pressure drilling, when one reverses the direction of rotation of a dull drill, the glass does not penetrate all the way to the bond material and therefore does not remove most of the dull diamonds at the outer portion of the drill bit.

It has been customary, in prior-art glass-drilling operations, to allow the spindle to reciprocate and rotate within the motor housing. It is undesirable to allow the glass particles to get within the motor since they would destroy the motor. Therefore, a seal, commonly called a quill, has been used to keep glass particles from within the motor. This has not been very effective due to the fact that it is extremely difficult to seal a shaft when there is both rotary and sliding motion. The present invention has solved this problem since there is no reciprocating motion of the spindle within the motor. Rather, the entire motor reciprocates with the spindle. With this apparatus, it is now possible to effectively seal against ingress of the glass particles since there is only rotary motion between the spindle and the motor housing. There are a number of effective seals commercially available, but I have found that a simple labyrinth seal is most desirable.

DESCRIPTION OF THE DRAWINGS

A complete understanding of the invention may be obtained from the foregoing and following description thereof taken in conjunction with the appended drawings, which are diagrammatic and not to scale unless noted, and in which.

DESCRIPTION OF THE PREFERRED EMBODIMENT

Figure 1:
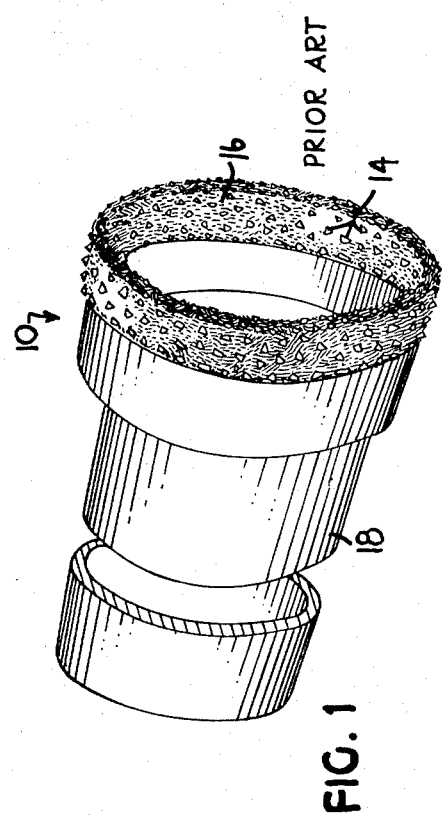
FIG. 1 is a diagram of a metal bonded diamond glass drill.

Referring to FIG. 1, there is shown an enlarged view of a conventional metal bonded diamond glass drill 10. Such drills have a glass abrading surface which comprises diamonds 14 bonded in suitable metals 16 (both of which have been exaggerated in FIG. 1 for clarity). The glass abrading surface of the drill is annular in shape and drilling is accomplished by the abraiding forces created by the diamonds projecting from the drill. The drill is mounted on a hollow shaft 18 to provide a suitable rotary motion by an electric motor.

Figure 2:
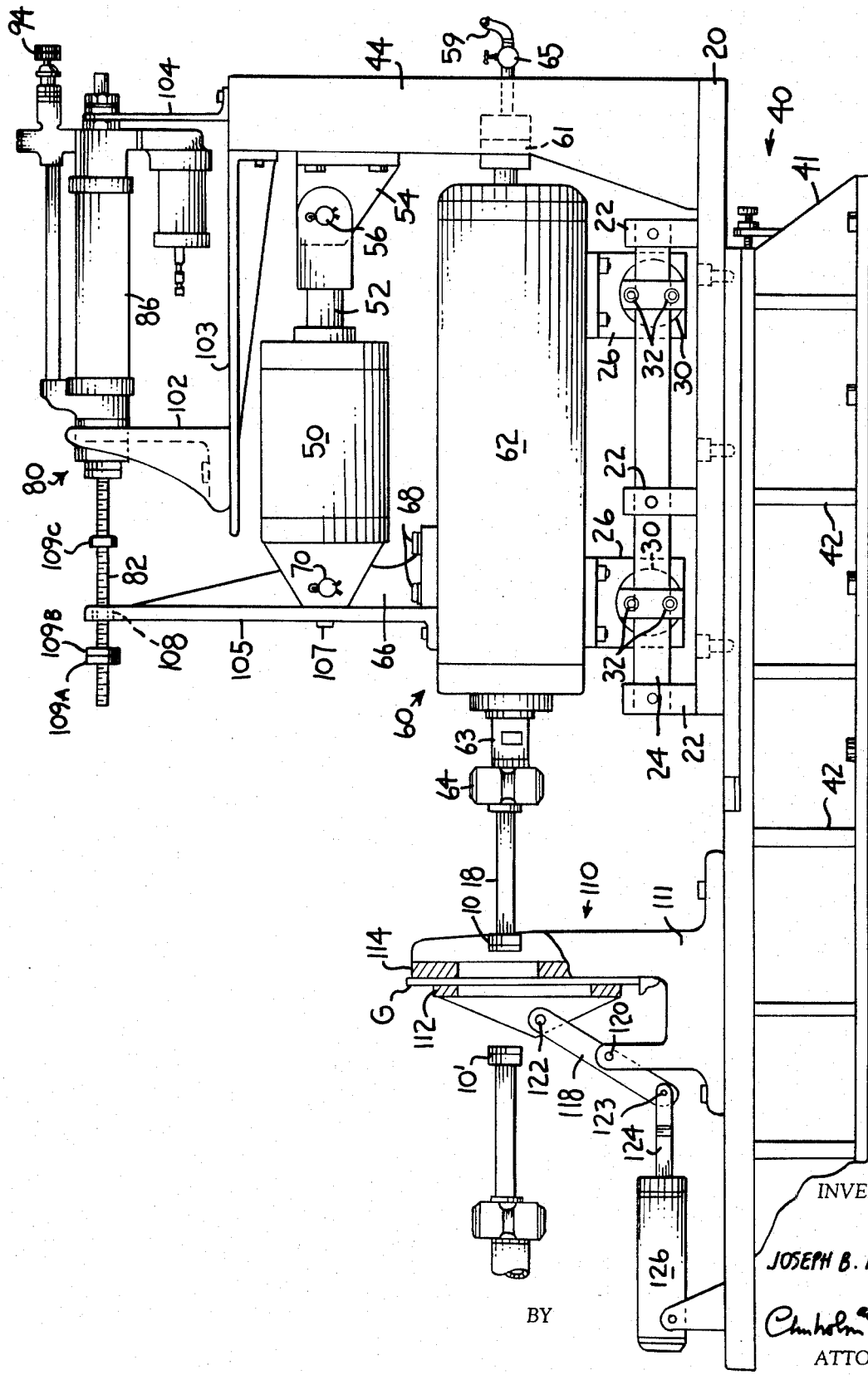
FIG. 2 is a schematic elevation view of the apparatus used in practicing the method of the instant invention, i.e., apparatus for drilling glass by advancing the drill bit at a constant rate of speed.

Referring to FIG. 2, there is shown a drilling apparatus for carrying out the method of the present invention. The apparatus consists of five assemblies, namely: a support assembly 40, a drill assembly 60, an air cylinder 50, means 80 for controlling the rate of advance of a drill, and a work piece holder 110.

SUPPORT ASSEMBLY

Support assembly 40 has a base plate 20 which extends in a horizontal plane. Perpendicular shaft supports 22 are attached to base plate 20 in a vertical position. While three shaft supports have been illustrated, it is to be understood that any suitable number may be used. FIG. 2 shows one of a pair of shafts 24 mounted on shaft supports 22. The additional shaft 24 extends horizontally and is parallel to the one shown. As viewed in FIG. 2, the shaft 24 that is illustrated is in front of the one not shown. Both of these shafts are made of case hardened steel to avoid deflection. Base structure 41 is constructed of heavy steel plates with reinforcing ribs 42. Cylinder mount 44 extends in a vertical direction and is rigidly connected to base plate 20 at one end thereof. Cylinder mount 44 consists of an elongated metal plate that extends vertically beyond air cylinder 50.

DRILL ASSEMBLY

Drill assembly 60 acts to rotate the drill from about 3,400 rpm to about 3,600 rpm. The drill assembly includes an electric motor 62 which rotates a spindle 63. At the forward end of motor 62 is a rotary seal 61 to prevent ingress of abrasive glass particles into the motor. A simple labyrinth seal has been found to be very effective. At one end of spindle 63 is a drill chuck assembly 64 for receiving hollow shaft 18. In the embodiment illustrated, the drill 10 is water cooled. Spindle 63, which is hollow, is supplied with water from its rear end by any suitable source, such as a hose 59 connected to spindle 63 by means of a rotating water joint 61. Cooling water flows from spindle 63 to shaft 18 and then to drill 10. A petcock 65 can be used as a limiting orifice to prevent water from surging into the drill when the drill is not engaging the glass work piece.

Drill assembly 60 has roller mounts 26, one pair mounted at each end of the drill assembly. A rolling V-bearing assembly is positioned on each roller mount 26. Each roller mount 26 is designed to be almost friction-free. It consists of a circular plate 30 and a pair of rollers 32. Each shaft 24 is disposed between a pair of rollers 32 and in contact with them. The circular plate 30 can be adjusted to regulate the pressure of the rollers 32 on the shaft 24. This pressure contact of the rollers against the shaft insures that the drill assembly is moved toward the glass by the movement of air cylinder 50.

AIR CYLINDER

Drill assembly 60 is moved toward the glass work piece by an air cylinder 50 and an associated piston rod 52. Bracket 54 is rigidly connected to cylinder mount 44, and piston rod 52 is pivotally connected to bracket 54 by a pin 56. Attached to the forward side of air cylinder 50 by a pin 70 is a bracket 66. This bracket is attached to motor 62 by bolts 68.

Using a diamond drill having a grit size of 60–80 mesh, a forward or advancing drill speed of 0.040 to 0.100 inches per second is acceptable, and a drill speed of 0.050 to 0.060 inches per second is preferred. With a coarser grit size the advancing speed may be increased. Speeds below 0.040 inches per second are not practical since drilling time increases and the life of the drill bit decreases.

MEANS FOR CONTROLLING THE RATE OF ADVANCE OF THE DRILL

The apparatus heretofore described is capable of advancing a drill at a constant pressure into a glass work piece G. By adding a means for controlling the rate of advance of the drill, I change from a constant-pressure operation to a constant-speed operation. I do not claim to have invented a means for controlling the rate of advance of a piston-cylinder arrangement and several such means are now commercially available. One such means is a Bellows HYDRO-CHECK, sold by the Bellows-Valvair Corporation of California. FIG. 2 shows a HYDRO-CHECK 80 in position to control the rate of advance of cylinder 50 (and therefore drill 10).

Figure 3:
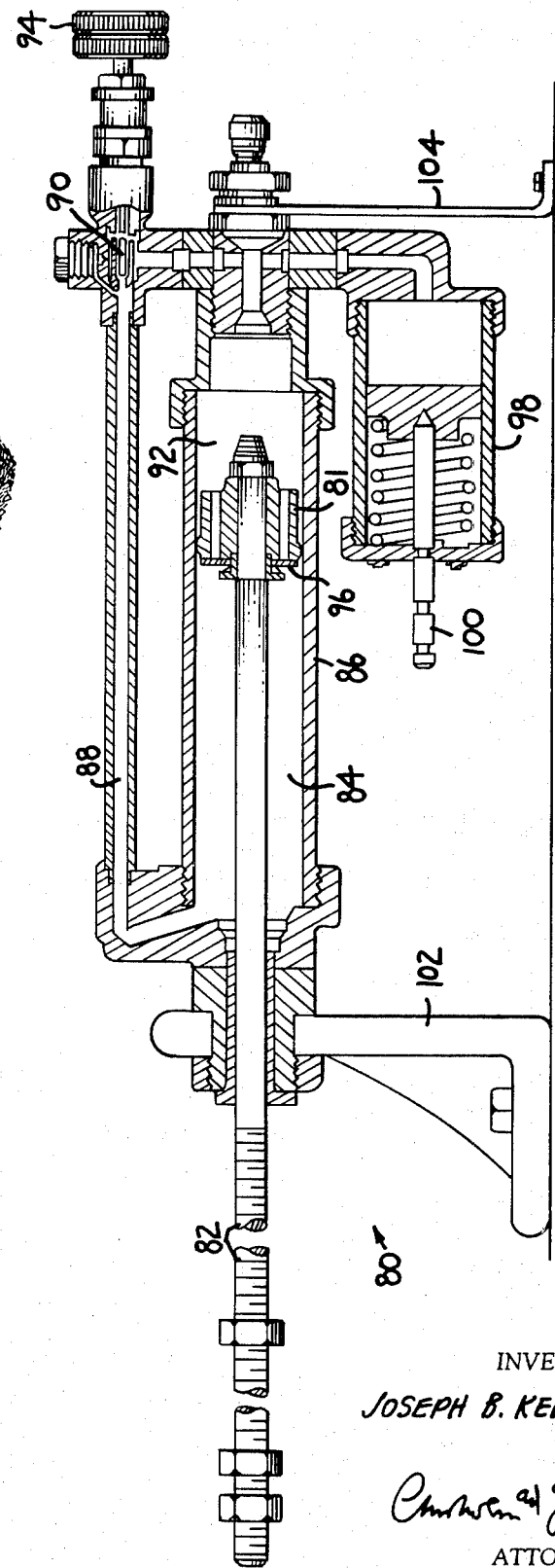
FIG. 3 is a schematic cross-section of a means for controlling the rate of advance of a drill.

Referring to FIG. 3, there are shown the details of HYDRO-CHECK 80. It includes a piston rod 82 extending into a checking cylinder 86. As the piston rod 82 is pulled out, a moving piston 81 forces oil in the front portion 84 of the checking cylinder 86 through a transfer tube 88 and a needle valve 90 into the rear portion 92 of checking cylinder 86. The rate of flow of the oil is determined by the setting of a knurled knob 94 which controls the size of the passage through needle valve 90. Thus, the rate at which piston 81 (and therefore piston rod 82) can be advanced may be controlled with accuracy. On the return stroke, one-way valve 96 permits oil to flow freely through the piston.

The spring-loaded balance cylinder 98 acts as a reservoir for the volume of oil displaced by the piston rod 82 on the inward stroke, and returns this amount to the checking cylinder 86 on the outward stroke. Indicator rod 100, attached to the balance cylinder piston, indicates the amount of oil in the HYDRO-CHECK and when oil should be added.

Brackets 102, 103 and 104 are used to rigidly mount HYDRO-CHECK 80 to cylinder mount 44.

At the forward end of the HYDRO-CHECK assembly is a bracket 105 which is rigidly connected to air cylinder 50 by a bolt 107. In the upper end of bracket 105 is a hole 108 which is larger in diameter than the outside diameter of piston rod 82 so that the rod 82 can slide freely thereon. Mounted on piston rod 82 are three nuts 109A, 109B, and 109C. Nut 109B is positioned so that as bracket 105 moves to the left due to the actuation of the air cylinder, bracket 105 engages nut 109B just prior to drill 10 contacting the glass work piece G. Any further movement to the left of bracket 105 will be limited by the opening of the needle valve 90 in HYDRO-CHECK 80, so that the advance of drill 10 is at a constant rate when the drill penetrates the work piece G.

WORK PIECE HOLDER

A work piece holder 110 is positioned adjacent the drill assembly. A U-shaped base plate 111 provides a mounting for a movable back plate 112 and a fixed face plate 114. A connecting arm 118 is pivotally attached to base plate 111 by any suitable means, such as a pin 120. Arm 118 is pivotally connected to back plate 112 by pin 122 at one end and to piston rod 124 by pin 123 at the other end. Back plate 112 clamps the work piece G against face plate 114 by the actuation of the piston rod 124 in a cylinder 126, which is attached to base plate 20. Both the back plate 112 and the face plate 114 have openings therein to permit passage of a drill.

OPERATION

The first step in the method is to adjust the opening in needle valve 90 by turning knurled knob 94. This sets the rate of advance of the drill. A work piece G is then positioned against a face plate 114 and a back plate 112 is brought into contact with the work piece G to clamp the work piece in place. Pressure in air cylinder 50 causes the cylinder and therefore the drill assembly 60 to move to the left. Cylinder 50 should be capable of producing at least a 200-pound thrust and a 300-pound thrust is preferred. The size of the drill varies, depending on the hole size desired, but I have used a drill having an outside diameter of 0.523 inches and a wall thickness of 0.040 inches to produce a hole about 0.525 inches in diameter. Drill 10 is subject to the entire pressure within air cylinder 50 and the initial movement of the drill is therefore quite rapid. This is desirable since there is no need, at this time, to advance the drill at a speed that is slow enough to be suitable for drilling into glass. Nuts 109A and 109B are placed on piston rod 82 in such a manner so that bracket 105 engages nut 109B just before drill 10 engages the glass work piece G. In order for the bracket 105 to continue its movement to the left, it must move piston rod 82. To move piston rod 82, oil must be forced through transfer tube 88 and needle valve 90. Since the fluid in the HYDRO-CHECK is substantially non-compressible, the rate of movement of the piston rod 82 is determined solely by the opening in needle valve 90, which can be set by knurled knob 94.

When the drill 10 has penetrated a desired amount into the work piece G, a timer (not shown) returns the air cylinder and therefore the drill assembly to its original position. Note that as the air cylinder 50 retracts to the right, bracket 105 engages nut 109C and therefore causes piston rod 82 to return to its original position. The apparatus is now in position to commence drilling another hole.

Although only one complete apparatus has been shown, it is normally desirable, when drilling into glass, to drill from both ends, i.e., advance the first drill 10 to approximately the middle of the work piece, retract the first drill, and advance a second drill 10' from the opposite side of the work piece to remove the core and finish the hole. It is not practical to drill glass from only one side, because the surface opposite the drill will spall just prior to breakthrough.

It has been customary in the glass-drilling art, when using two opposing drills, to have the first drill apply its force against the movable plate. The theory behind this is that the glass is strongest before the first drill removes any glass. The second drill finds the glass work piece weaker than the first drill found it. Since the glass is weaker, it offers less resistance to the drill and it needs more support to avoid any unwanted deflection. Ordinarily, the movable plate is weaker than the fixed plate. Therefore, the movable plate is used to support the glass from behind during the first drilling operation.

I have found that unless the movable support is strengthened, so that it holds the work piece without letting it deflect, the constant-feed drilling apparatus deteriorates to a constant-pressure apparatus. This is because the glass, without sufficient support, is moved by the drill for a distance which is a function of the pressure applied to the glass. Therefore, the relative speed of the drill with respect to the glass is no longer constant. Tests have indicated that a movable plate capable of withstanding 200 pounds of thrust without significant deflection is inadequate since it allows the glass to deflect. The movable support should be capable of supporting the glass without any glass deflection. If the support is capable of supporting 750 pounds of thrust, it is acceptable, but 1,000 pounds is preferred. It is helpful to make the hole in the movable plate very close in size to the outside diameter of the drill bit to provide maximum support.

I claim as my invention:

1. A method of drilling a glass work piece which comprises rotating a drill at a speed suitable for drilling glass, and advancing the drill into said glass at a constant rate of speed, said drill being advanced by a force which is greater than that necessary to advance said drill, but which is checked so that only the force necessary to advance said drill at a given constant rate of speed is applied thereto.

2. In a method of drilling a glass work piece the method comprising the steps of:
   a. positioning a glass work piece adjacent a drill;
   b. rotating said drill at a speed suitable for drilling glass; and
   c. advancing said drill into the surface of said glass work piece at a constant forward rate of speed, said drill being advanced by a force which is greater than that which is necessary to advance said drill, but which is checked so that only the force necessary to advance said drill at said constant rate of speed is applied thereto.

3. A method of drilling glass wherein the drill is advanced into the glass at a constant rate of speed of about 0.055 inches per second while the drill is rotating at about between 3,400 revolutions per minute and 3,600 revolutions per minute, said drill being advanced by a force which is greater than that which is necessary to advance said drill, but which is checked so that only the force necessary to advance said drill at said constant rate of speed of about 0.055 inches per second is applied thereto.

4. A method of drilling a hole in a glass work piece which comprises:
   a. rotating a first drill at a speed suitable for drilling a hole in glass;
   b. rotating a second drill at a speed suitable for drilling a hole in glass; and
   c. advancing said first and second drills into the glass work piece from opposite sides at a constant rate of speed, each of said drills advancing at least to the approximate midpoint of said work piece, each of said drills being advanced by a force which is greater than that which is necessary to advance said drills but which is checked so that only the force necessary to advance said drills at said constant rate of speed is applied thereto.

5. A method of drilling a glass work piece comprising the steps of:
   a. positioning a glass work piece adjacent a drill;
   b. rotating said drill at a speed suitable for drilling glass; and
   c. advancing said drill into a surface of said glass work piece at a forward rate of speed that is independent of the sharpness of the drill, the resistive forces of the glass, and the frictional forces in a drilling apparatus which is advancing said drill, said drill being advanced by a force which is greater than that which is necessary to advance said drill, but which is checked so that only the force necessary to advance said drill at said constant rate of speed is applied thereto.

6. A method of drilling a glass work piece which comprises the steps of:
   a. positioning a glass work piece adjacent a drill;
   b. rotating said drill at a speed suitable for drilling glass; and
   c. advancing said drill into a surface of said glass work piece in such a manner that the depth of penetration of the drill bit into said glass work piece is determined by the rate of advance of said drill bit, the speed or rotation of said drill bit, and the grit size of diamonds in said drill bit, and is independent of the sharpness of the drill bit, the resistance of the glass work piece, and the frictional forces in the apparatus advancing the drill bit, said drill being advanced by a force which is greater than that which is necessary to advance said drill, but which is checked so that only the force necessary to advance said drill at said constant rate of feed is applied thereto.

* * * * *